Figure 1:
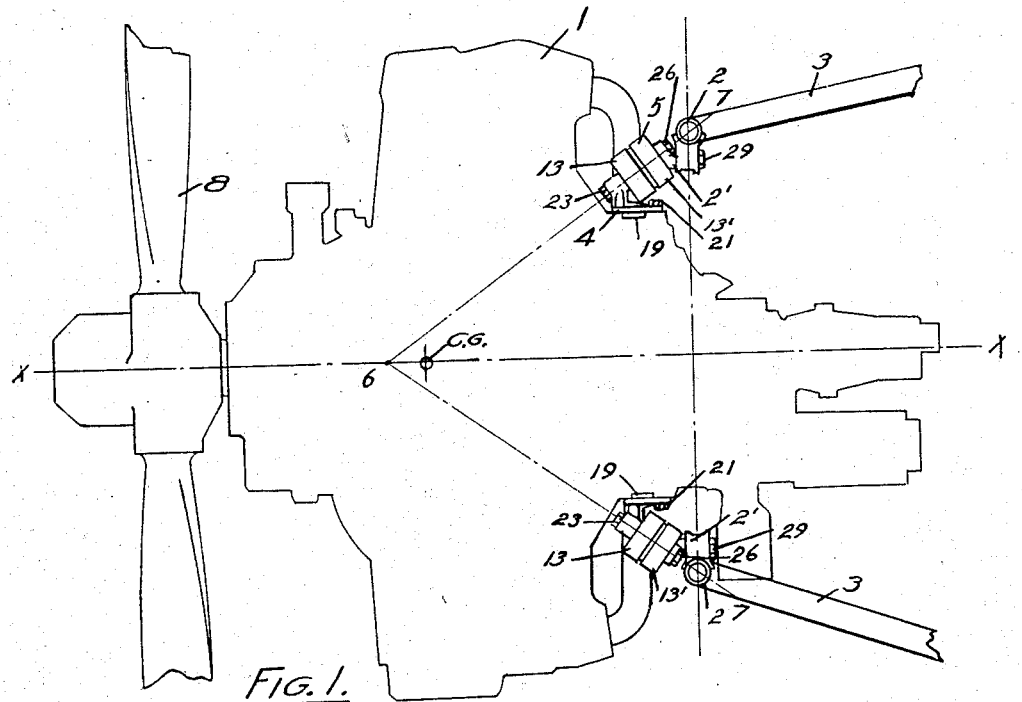

May 13, 1941.　　　　H. C. LORD　　　2,241,408
MOUNTING
Filed March 6, 1940　　　3 Sheets-Sheet 1

INVENTOR
Hugh C. Lord

May 13, 1941.  H. C. LORD  2,241,408
MOUNTING
Filed March 6, 1940  3 Sheets-Sheet 2
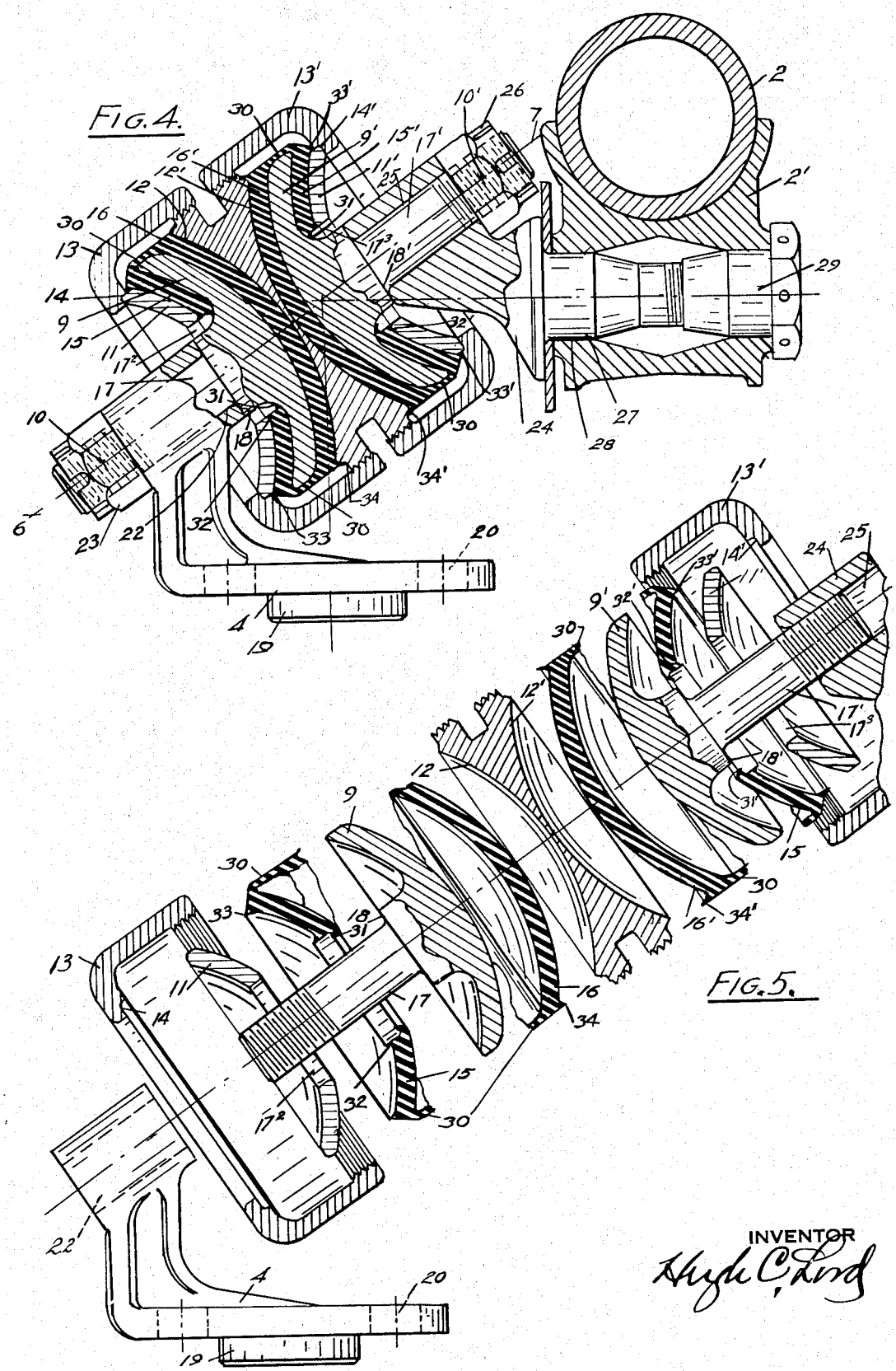

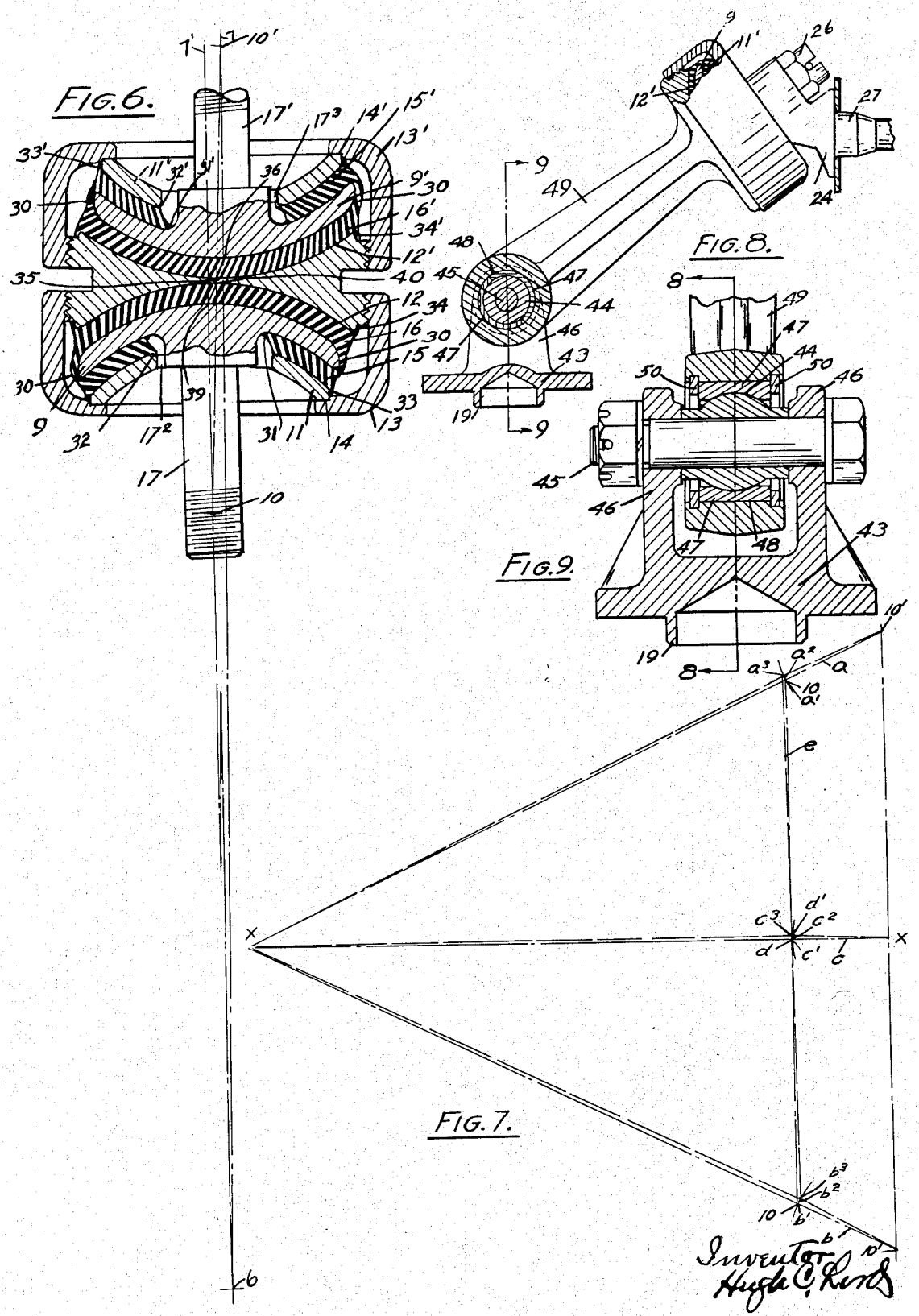

Patented May 13, 1941

2,241,408

UNITED STATES PATENT OFFICE 2,241,408

MOUNTING

Hugh C. Lord, Erie, Pa., assignor to Lord Manufacturing Company, Erie, Pa., a corporation of Pennsylvania Application March 6, 1940, Serial No. 322,470

19 Claims. (Cl. 248—5)

The present invention is directed to the improvement of mountings designed to quiet vibrations.

Instruments subjected to vibrational disturbances respond to varying characteristics, each adding its peculiar problem and each of which must be satisfied to obtain the best results. To satisfy these problems it is usually necessary to provide greater freedom in some directions to satisfy the major disturbances, and comparatively greater resistance in other directions to satisfy load carrying and shock sustaining requirements.

The present invention provides great flexibility and adaptability in satisfying the variations in characteristics and requirements involved in mountings of this character and further, the stresses on the rubber are so directed and arranged as to give uniformity of performance and ease in calculating vibration characteristics and load stresses which must be provided in the mounting to satisfy differing installations.

The invention as here exemplified is utilized to mount an overhung aeroplane engine, particularly a radial engine, and, while in its broader aspects the invention is not so limited, it has particular advantages in this environment.

It has heretofore been realized that rubber in shear, while affording stability, is more yieldable and consequently important in mountings of this character. This shear relation is more definitely established by bonding the shear stressed rubber to the shear controlling surfaces with which the rubber acts.

In satisfying the torque induced vibrations of an engine, and particularly in connection with a radial aeroplane engine, it has been previously suggested that these torque disturbances can best be quieted by rubber in shear. This has been accomplished by arranging tubular mountings having rubber bonded to inner and outer members and mounted with their axes tangentially arranged around the engine supporting ring, thus presenting the rubber largely in direct stress in the direction of the center of gravity affording greater resistance than the torque resistance to sustain the load of the engine and hold the engine against drooping.

Similar characteristics have been suggested for an overhanging aeroplane engine mounting to which there is added yieldability in shear of the rubber for translational vibrations while maintaining the load characteristics by direct stress of the rubber. This has been accomplished by so-called sandwich mountings arranged in a plane at right angles to the axis of the engine.

Greater freedom in a translational direction while retaining the other characteristics of the perpendicularly arranged sandwich mountings has been provided by the use of parallel links having ball surface joints at the ends of the links.

It has been found that devices such as engines not only develop translational and torsional disturbances, but also what is known as angular vibration, that is, a tendency to move on a focal center adjacent to or at the center of gravity so that the axis of the engine tends to develop an hourglass pattern centered at the center of gravity. Recognizing this disturbing factor, a mounting has been made which gives rubber shear responding freedom to this angular vibration and also rubber shear responding freedom to torque impulses while retaining freedom in a translational direction. This was accomplished by tangentially arranged tubular mountings combined with tubular mountings extending from the tangential mountings in a direction parallel to the axis of the engine, thus providing rubber in shear stress both tangentially and axially of the engine, but this arrangement while giving angular freedom did not support the engine load through direct stress of the rubber and therefore did not as satisfactorily as the prior structures referred to, prevent drooping of the engine.

In a further development freedom has been maintained, so far as the angular and torsional vibrations are concerned, through shear response of the supporting rubber but the load is carried through direct stress of the rubber. A typical arrangement provides so-called "sandwich" mountings arranged tangentially to a sphere having a focal point slightly in front of the center of gravity. The focal lines being at right angles to the sandwich surfaces places the load stress directly across the rubber or in direct stress. This effectually prevents undue drooping of the engine; but does permit angular and torsional freedom.

It has also been suggested that bodies having vibratory oscillations could be satisfactorily mounted on cushioned links directed toward the center of oscillation, the links thus controlling the oscillatory movement and the freedom of vibration, the vibration being partly satisfied by the swinging of the links and partly satisfied by the cushion, the cushion forming at least part of the necessary resistance to the swinging movement.

The link idea has been adapted for overhung aeroplane engines responding not only to the torsional movements of the engine but also equally to the angular movements of the engine. This is accomplished by directing the links to a focal point, as distinguished from a direction parallel to an axis.

The present invention is an advance over the prior art so enumerated.

The sandwich structure tangent to a sphere is theoretically desirable but it lacks flexibility in its adaptation to different environments and in its capacity for variations in comparative resistances to accommodate it to changes in vibrational and load carrying requirements and also its adaptability with relation to variations in support and engine design. There is also some pinching of the rubber as the plates swing.

The focally directed links subject some of the joints in response to angular movement to a cocking action and to a direct axial shear movement in the link joint, while as to other angular vibrations the link joints are subjected to torsion. Some of these stresses of the rubber are difficult to calculate both as to resistances and as to load requirements and wear and present some difficulties as to installation.

In the present invention the load characteristics of direct cross-stress pressure or tension is retained for sustaining the load along the focal lines extending from any desired focus, ordinarily somewhat in front of the center of gravity. It provides freedom in response to torque impulses through shear of the rubber.

It provides angular freedom through shear stress of the rubber. The rubber is arranged so that the stresses both with relation to torque and angular vibrations and load carrying requirements are evenly distributed and satisfied without locally undue straining any portion of the rubber. The uniform stressing of the rubber makes the calculations of rubber and parts dimensions to satisfy an environment comparatively simple and direct.

It provides a structure relieved of any unusual strains and consequently makes possible a lighter and simpler structure. It provides adaptability whereby the comparative resistances in different directions may be readily changed to take care of requirement conditions. It also provides a device that may be readily adapted for attachment to varying designs of parts united by the mounting.

Features and details of the invention will appear more fully from the specification and claims.

Preferred embodiments of the invention are illustrated in the accompanying drawings as follows:

Fig. 1 shows a view in outline of an overhanging radial engine with the mountings and support in place, the supporting ring being in section.

Figure 2:
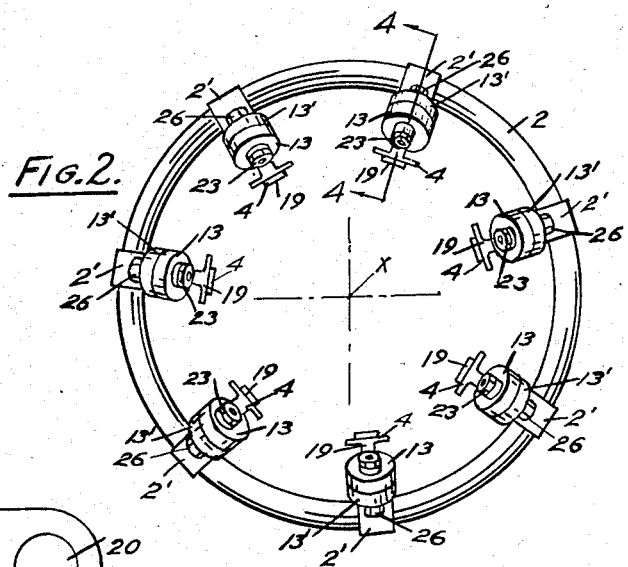

Fig. 2 an elevation looking toward the rear of the supporting ring with the mountings thereon, said mountings being detached from the engine.

Figure 3:
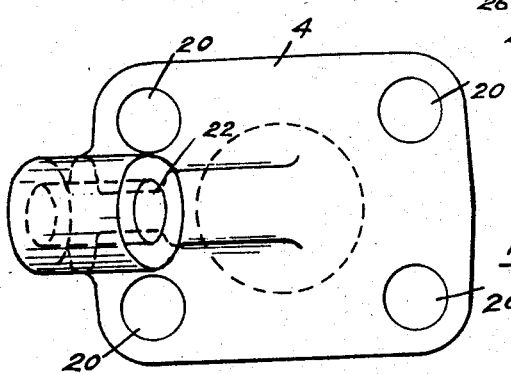

Fig. 3 an enlarged view of the engine pedestal for securing the engine end of the mount.

Fig. 4 a section on the line 4—4 in Fig. 2.

Fig. 5 a view showing the different parts of the structure separated axially.

Fig. 6 a section on the line 4—4 in Fig. 2 showing the position of the parts, assumed with an angular movement of the engine.

Fig. 7 a diagram of the engine link movements to accommodate an angular movement of the engine.

Fig. 8 a sectional view of an alternative construction.

Fig. 9 a section on the line 9—9 in Fig. 8.

1 marks an engine; x—x the approximate rotative axis of the engine; 2 an engine supporting ring carried by struts or frame supports 3. Pedestals 4 are secured circumferentially around the engine, ordinarily to the rear of the center of gravity, marked c. g. in Fig. 1.

A mounting 5 is secured to the pedestal 4 and to the bracket 2' on the ring. The focal line 6—7' extends from the focal point 6 through the mounting. This focal line, as illustrated, is at an angle to the axis x—x of approximately 35°. This angle, of course, may be shifted as may be necessary by reason of the structural features of the engine or by reason of the vibrational requirements in the set-up.

A propeller 8 is carried on the forward part of the engine in the usual manner and its vibrational characteristics are added to those of the engine to be quieted by the arrangement of the mountings.

The mounting comprises links converging on the focal point. Spherical units form swinging joints for each of the ends of the links. These joint units have cores 9 and 9' centered at 10 and 10' respectively—that is to say, the centers of the ends of the link are 10 and 10' establish the effective length of the link. Spherical plates 11 and 11' are arranged on the concave sides of the cores, and a center having spherical portions 12 and 12' opposed to the convex sides of the cores is arranged between the cores. Frame members 13 and 13' are provided with grooves 14 and 14' forming seats for the plates 11 and 11'. The frame members are screwed onto the parts 12 and 12' so that the parts 11 and 11' and 12 and 12' are maintained as a rigid unit but do not interfere with the freedom of the cores. The axis of this frame swings on the link centers and is always in alignment with these centers. It is, in fact, the link.

Rubber or resilient material 15 and 15' is arranged in the spaces between the cores 9 and 9' and the plates 11 and 11' and similar rubber layers 16 and 16' are arranged between the cores 9 and 9' and the center portions 12 and 12'. The rubber is bonded to the engaged surfaces preferably during vulcanization so as to retain the rubber in place as it is stressed in shear by the swinging of the surfaces.

The cores 9 and 9' have stems or projections 17 and 17' respectively. The plates 11 and 11' have openings 17² and 17³ affording clearance between the stems and the plates to permit movement of the cores. Preferably the cores are provided with shoulders 18 and 18' from which the stems project.

The pedestal 4 has a centering projection 19 on its base 4' to assist in definitely locating it with relation to the engine, and the base is provided with perforations 20 through which securing cap screws 21 extend. The pedestal has a perforation 22, the axis of which may be in alignment with the focal line, and a nut 23 is arranged on the end of the stem locking the stem in the pedestal.

An adapter 24 is provided with an opening 25 through which the stem 17' extends, this opening having its axis preferably on the focal line. The stem is secured in the adapter by a nut 26. The adapter has a shank 27 which extends through an opening 28 in the bracket 2' and this shank is secured on the bracket by a nut 29. It will be noted that the axis of the shank 27 extends to the center of the core 9' so there is no turning movement exerted on the shank.

The rubber at 30 extends around the ends of the core and the rubber as a whole is spaced from the frame parts. With an extreme movement of the core, the rubber 30 contacts the frame and forms a limiting stop. As stated, preferably the rubber is bonded to the surfaces engaged, the bonded edges of the rubber terminating in thin edges 31, 31', 32, 32', 33, 33', 34 and 34', such a thin edge relieving the exposed edge of the bond, thus very materially strengthening the union at the critical point.

With this structure, the links swing on the link centers to permit an angular freedom of movement of the engine, the rubber yielding to this movement entirely in shear. The shear stress throughout the rubber is uniform and no part of the rubber is pinched in that the swinging movement is in line with the rubber surfaces.

It will be noted from the view in Fig. 6 that the engine has moved angularly from the focal line 6—7 to the focal line 6—7', that the axis of the member 12 and 12' and frame have their axes directly on the axis of the link centers, the inner center being offset from the original focal line 6—7 to the focal line 6—7'; that the line of deflection of the element 16' is indicated by the line 35—36 and the shear deflection of the element 15' is indicated by the section lines; and that the shear movement of the lower joint unit is represented by the distance between the line 6—7' and the line joining the centers 10 and 10', the sum of the movement in the two joint units centered at 10 and 10' being slightly less than the movement of the engine about the focal point at the center of the mounting from the lines 6—7 to the line 6—7'. The shear stress on the rubber in the joints 16 is indicated by the lines 39—40, and 15 by the section lines. Dividing the movement in this way reduces the necessary clearance provided by the openings 17² and 17³.

While the view in Fig. 6 is designed to represent angular movement and is typical of angular movement in any direction, the swinging of the link on the joint elements is substantially similar to that involved in the torsional movement. That is to say, the torsional movement is accommodated by a swinging movement of the links except that, by reason of the circumferentially directed angular movement of the links, the link joints are slightly rotated, as well as rocked, but the entire movement is satisfied in shear, with a shear stress practically uniform throughout.

In the diagram, Fig. 7, we have designated an upper link by the line $a$, the center (10) as $a'$, the arc traversed by the link in an upward angular movement of the engine by the line $a^2$, and the point to which $a'$ is swung in this upward movement as $a^3$. We have designated the lower link by the line $b$, the center 10 as $b'$, the arc traversed by the link as $b^2$, and the ultimate point reached by the link as $b^3$. In this arrangement the center $d$ of the engine will be moved upwardly and toward the rear to a point $d'$ midway in the line $e$ extending from the point $a^3$ to the point $b^3$.

For convenience in the diagram in Fig. 7 we have assumed the presence of eight instead of seven mounting units, as in Fig. 2, and thus the side links will both be in a horizontal plane passing through the axis, but in line with the focal angle. So far as the upward movement of the rear of the engine is concerned, as indicated in the diagram Fig. 7, the side links move in unison and so far as the center point on the engine is concerned may be treated as a single link at the center foreshortened by reason of the focal angle and as indicated in the diagram. Such a link is indicated by the line $c$ having its free hinge point $c'$ which, when moved, follows the arc $c^2$ and with an upward movement coincident with that indicated in relation to the bottom and top links would reach a position marked $c^3$.

It would seem probable that the converging links having definite joint centers and with the free ends of the links all tied to the rigidly connected engine parts could not be swung in sufficiently conforming unison to permit angular freedom of the engine, but a careful analysis of the movements indicates that it is possible to give the engine angular movement through a practical working range and that the relation of the movements will be such as to compensate for divergent paths so as to make the system practical. Thus in the diagram, Fig. 7, when the point $c'$ of the link $c$ has reached the point $c^3$, which it will reach, with an upward movement of the engine, the point $c^3$ and the point $d'$ so nearly coincide that the divergence is so small as to be practically undiscernible in a scale drawing and there will be less difference than would be involved in ordinary working construction tolerances. Thus the focal point may be selected and controlled by the free-swinging links converging toward the selected focal point and operating on definitely centered spherical bearings.

Again the swinging of the links circumferentially in response to torque reactions operates equally all around on the engine so that this torque swinging movement creates no binding action. It will be noted, however, that the top and bottom links with this circumferential swinging movement will be moved slightly out of the vertical plane, but their relations will not be materially changed so far as up and down movement is concerned. The side links with such a swinging movement will move one side link downwardly from the horizontal and the opposite side link upwardly, but this up and down movement, as well as the slight endwise movement of the engine, will be neutralized at the center of the engine so that the point $d$ will remain in the axis $x—x$.

When, however, there is combined with the torque swinging an angular upward pitch movement, as indicated generally in Fig. 7, the top and bottom links will move very much as they do in Fig. 7, but the side link that has moved downwardly will have a return upward movement so that it may reach its initial position and the link at the up movement side of the same amplitude may move upwardly to substantially twice the distance brought about by the circumferential swinging under torque. Thus the part $d$ midway between the free ends of the side links will be moved upwardly and rearwardly substantially to the extent indicated in Fig. 7, and the point $d$ will very nearly coincide with the point $d^3$ in the line $e$. In fact, this divergence will be so small that it would create no more disturbance than would be found from divergence in ordinary working tolerances.

I have found that a relation of parts involving a focal angle of 35° from the axis, a distance from the center of the mount to the focal point of 21.216 inches, a length of link of 4 3/32 inches, a radius of approximately 1¾ inches to the center of the core of each unit compensates the variation in link movements so closely that the difference is so little as not to appear within the limits of line drawings in a graphical representation. This relates to the extreme movement as indicated of a focal line of 0° 30', this being sufficient for the ordinary vibratory movement.

The divergence of these link movements increases somewhat as the focal angle increases, and correspondingly decreases as the focal angle is decreased. The divergence also is altered by the length of the link, that is, the distance between the link centers. The longer the link centers, the less the comparative divergence of the free ends of the links from a plane fixed with the engine.

While I have shown but one angular position in Fig. 7—that of an upward pitch movement—it will be understood that the relation of the links for a downward pitch or for accommodating the yaw of the engine or combinations of these movements is the same, the only difference being that different links respond to different directions of engine movement. It will also be understood that the links between the top and sides have resultants between these two satisfying the general scheme of operation of the system.

It will be understood that by reason of the relations of the angles, links, or other conditions, the circumferential movement incident to torque may be neutralized by inclining the bores in the pedestal and adapter so as to so initially incline the unit as to bring the units at torque position in planes passing through the axis of the engine. It will also be understood that, if desired, the rubber elements may be made slightly thicker for the side mountings thus rendering them slightly softer if a greater divergence, by reason of greater focal angles, lengths of links, or other conditions, makes this desirable, the load-carrying mountings remaining substantially the same.

It will be noted that the entire structure, including the stems and spherical plates, is united through the bonding of the rubber as a single working unit and that the rubber surfaces are locked against movement relatively to the surfaces engaged by a surface lock, preferably a vulcanized bond, so that with relative movement of the stems 17, 17' the action is accommodated by this freedom of movement of the parts united through the bond by action of the rubber in shear and that the direction of force at each point of the spherical surfaces engaged by the rubber is substantially tangential, or in the direction of the surface at the point of engagement, so that the side movement is entirely sustained by this surface engagement. Thus the relation of the cores 9, 9' and 12, 12' is maintained and controlled with shear freedom through this bonding relation independently of the presence, or absence of the frame members.

It will be noted that this mounting subjects practically all the rubber involved to direct stress, either tension or compression, in sustaining the load thrusts on the focal lines. It will also be noted that all swinging movement which accommodates the torque and angular movement is in direct shear stress and thus effords very much less resistance to angular and torque movements. On the other hand, by arranging the focal point in advance of the c. g., such translational movement as is desirable is accommodated.

It will also be noted that if the distance between the units, in other words the parts 12 and 12' are separated, the shear movement incident to the swinging of the links will be reduced, consequently there is a comparative reduction of shear resistance as related to the axial or focally directed resistance, the focally directed resistance remaining substantially constant. It will also be noted that by separating the link centers the relation may be changed.

By extending the cores to take a greater number of degrees of arc, the rubber in these extensions will have the same shear resistance as the rest of the rubber to rocking or swinging action, but this outer portion of the rubber will not present the same resistance to focal stress as the parts of the rubber which are substantially at right angles to that stress. In oher words, as the rubber is carried around, it presents some of the rubber resisting the focal stress in shear stress. This again makes possible a variation in these parts.

A structure of great capacity may be included in a small unit because the rubber is not overstressed at any local point, is not unduly pinched at any local point, or is not skewed from its normal moving relation.

In the alternative construction shown in Figs. 8 and 9, the features are practically the same except there is substituted for the unit involving the core a metal ball joint. This ball joint involves a pedestal 43, a ball element 44 mounted on a bolt 45 extending through ears 46 on the pedestal. The outer part of the bearing has split sockets 47 engaging the surface of the ball 44 arranged in an opening 48 in the end of the link 49, which link is secured to the member 12.' The parts 47 are secured in the opening 48 by plates 50.

In operation this corresponds in the main to that of the preferred construction. It however, affords a greater resistance on the focal line as compared to the resistances in torque and angular movements.

What I claim as new is:

1. In a mounting assembly a vibrating body; a mounting means attached thereto for supporting the body comprising converging links, each link extending substantially in the direction of the load on the link, one end at least of each link being cushioned in resilient material such as rubber accommodating through its distortion the swing of the joint, substantially all of the material in action being preponderantly subjected to direct stress by thrusts lengthwise of the link.

2. In a mounting assembly a vibrating body; a mounting means attached thereto for supporting the body comprising a series of three or more links each link extending substantially in the direction of the load on the link and converging from out of line positions toward each other, one end at least of each link being cushioned in resilient material such as rubber and accommodating through its distortion the swinging of the joint, substantially all of the material in action being preponderantly subjected to direct stress by thrusts lengthwise of the link.

3. In a mounting assembly a vibrating body; a mounting means attached thereto for supporting the body comprising converging links, each link extending substantially in the direction of the load on the link, one end at least of each link being cushioned in resilient material such as rubber accommodating through its distortion the swinging of the joint, substantially all of the material in action being preponderantly subjected to direct stress by thrusts lengthwise of the link and a major portion of the resistance of the resilient material to swinging of each link being through shear stress of the material.

4. In a mounting assembly a vibratory body; a mounting means attached thereto for supporting the body comprising a series of three or more links converging from out of line positions toward each other, one end at least of each link being cushioned in resilient material such as rubber accommodating through its distortion the swinging of the joint and responding universally to angular movement of the link at the joint through a preponderance of shear stress of the material.

5. In a mounting assembly a vibratory body; a mounting means attached thereto for supporting the body comprising a series of three or more links converging from out of line positions toward each other, one end at least of each link being cushioned in resilient material such as rubber accommodating through its distortion the swinging of the joint and responding universally to angular movement of the link at the joint through a preponderance of shear stress of the material, the major portion of the material being preponderantly subjected to direct stress by thrusts lengthwise of the link.

6. In a mounting assembly a vibratory body; a mounting means attached thereto for supporting the body comprising converging links, one end at least of each link being cushioned in resilient material such as rubber operating between spherical joint elements.

7. In a mounting assembly a vibratory body; a mounting means attached thereto for supporting the body comprising converging links, one end at least of each link being cushioned in resilient material such as rubber operating between spherical joint elements, the major portion of the material in action being preponderantly subjected to direct stress by thrusts lengthwise of the link.

8. In a mounting assembly a vibratory body; a mounting means attached thereto for supporting the body comprising a series of three or more links converging from out of line positions toward each other, one end at least of each link being cushioned in resilient material such as rubber operating between spherical joint elements.

9. In a mounting assembly a vibratory body; a mounting means attached thereto for supporting the body comprising a series of three or more links converging from out of line positions toward each other, both ends of each link being cushioned in resilient material such as rubber operating between spherical joint elements.

10. In a mounting assembly a vibratory body; a mounting means attached thereto for supporting the body comprising a series of three or more links converging from out of line positions toward each other, one end at least of each link being cushioned in resilient material such as rubber operating between spherical joint elements, the swinging of the links being accommodated by a preponderance of shear stress of the material and the major portion of the lengthwise thrusts of the links being taken by direct stress of the material.

11. In a mounting assembly a vibratory body having induced torsional and angular vibrations; a mounting means attached thereto for supporting the body comprising a series of three or more links converging from out of line positions toward each other, one end at least of each link being cushioned in resilient material such as rubber and having universal swinging movement, said links controlling and accommodating the angular and torsional vibratory movements of the body through the swinging of the links.

12. In a mounting assembly a vibratory body having induced torsional and angular vibrations; a mounting means attached thereto for supporting the body comprising a series of three or more links converging from out of line positions toward each other and controlling and accommodating through the swinging movement of the links the angular and vibratory movements of the body, one end at least of each link being cushioned in resilient material such as rubber operating between spherical joint elements and accommodating through its distortion the swinging of the joint.

13. In a mounting assembly a vibratory body having induced torsional and angular vibrations; a mounting means attached thereto for supporting the body comprising a series of three or more links converging from out of line positions toward each other and controlling and accommodating through the swinging movement of the links the angular and vibratory movements of the body, one end at least of each link being cushioned in resilient material such as rubber operating between spherical joint elements and accommodating through its distortion the swinging of the joint, the major portion of the material being subjected to stress in shear through the swinging of the links in response to torsional and angular vibrations.

14. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in resilient material such as rubber accommodating through its distortion the swinging of the joint, substantially all of the material in action being preponderantly subjected to direct stress by thrusts lengthwise of the link.

15. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in resilient material such as rubber accommodating through its distortion the swinging of the joint, the links being related to control and accommodate the angular and torsional vibratory movements of the body through the swinging of the links.

16. In a mounting assembly a vibratory body adapted for overhung suspension on an upright support; a suspension attached to the body for supporting the body in overhung relation to such a support comprising a series of three or more links horizontally and vertically spaced converging toward each other, one end at least of each link being cushioned in resilient material such as rubber operating between spherical joint elements accommodating through its distortion the swinging of the joint, the links being related to control and accommodate the angular and torsional vibratory movements of the body through the swinging of thhe links.

17. In a mounting assembly a vibratory body adapted for overhung suspension on an upright support and including a rotating member and subjected to induced torsional and angular vibrations; a group of three or more links distributed about the axis of the rotating member and converging toward a focal point offset from the suspension, the links having a relation controlling and accommodating the torsional and angular vibratory movements through swinging of the links, one end at least of each link being cushioned in resilient material such as rubber operating between spherical joint elements and accommodating through its distortion the swinging of the joint.

18. In a mounting assembly having a vibratory body; a mounting means attached thereto for supporting the body comprising converging links and yielding means tending to hold the body at a neutral position, said links being provided with spherical surfaced end joints.

19. In a mounting assembly having a vibratory body; a mounting means attached thereto for supporting the body comprising converging links and yielding means tending to maintain the body at neutral, said links being provided with spherically surfaced joints, one joint at least having sliding spherical engaging surfaces.

HUGH C. LORD.